(12) United States Patent
Karampatsis et al.

(10) Patent No.: US 12,348,354 B2
(45) Date of Patent: Jul. 1, 2025

(54) REPORTING OCCURRENCE OF AN EVENT IN A MOBILE COMMUNICATION NETWORK

(71) Applicants: Lenovo (Singapore) Pte. Ltd., New Tech Park (SG); Dimitrios Karampatsis, Ruislip (GB); Apostolis Salkintzis, Athens (GR); Genadi Velev, Darmstadt (DE)

(72) Inventors: Dimitrios Karampatsis, Ruislip (GB); Apostolis Salkintzis, Athens (GR); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 220 days.

(21) Appl. No.: 17/790,895

(22) PCT Filed: Jan. 3, 2020

(86) PCT No.: PCT/EP2020/050102
§ 371 (c)(1),
(2) Date: Jul. 5, 2022

(87) PCT Pub. No.: WO2021/136598
PCT Pub. Date: Jul. 8, 2021

(65) Prior Publication Data
US 2023/0037802 A1 Feb. 9, 2023

(51) Int. Cl.
*H04L 41/0604* (2022.01)
*H04L 43/06* (2022.01)
(Continued)

(52) U.S. Cl.
CPC .......... *H04L 41/0604* (2013.01); *H04L 43/06* (2013.01); *H04W 24/10* (2013.01); *H04W 36/0085* (2018.08)

(58) Field of Classification Search
CPC ..... H04L 41/0604; H04L 43/06; H04L 41/14; H04L 43/065; H04L 41/0686;
(Continued)

(56) References Cited

U.S. PATENT DOCUMENTS 10,165,479 B2 * 12/2018 Kim ................ H04W 36/0085
2019/0394655 A1 * 12/2019 Rahman ................ H04L 41/142
(Continued)

FOREIGN PATENT DOCUMENTS

EP 4142318 A1 * 3/2023 ............ H04W 24/02
WO 2019032968 A1 2/2019

OTHER PUBLICATIONS

3GPP, "3rd Generation Partnership Project; Technical Specification Group Services and System Aspects; Architecture enhancements for 5G System (5GS) to support network data analytics services (Release 16)", 3GPP TS 23.288 V16.2.0, Dec. 2019, pp. 1-57.
(Continued)

*Primary Examiner* — Wutchung Chu
(74) *Attorney, Agent, or Firm* — Kunzler Bean & Adamson

(57) ABSTRACT

For data collection, apparatuses, methods, and systems are disclosed. One apparatus includes a transceiver that receives a first request from a network analytics function to monitor and report occurrences of a first event. The apparatus includes a processor that identifies a first type of network function in a mobile communication network that reports occurrence of the first event. The processor sends a second request to at least one network function of the first type to monitor and report occurrences of the first event and relays reports of occurrence of the first event from the at least one network function to the network analytics function.

20 Claims, 13 Drawing Sheets

(51) Int. Cl.
*H04W 24/10* (2009.01)
*H04W 36/00* (2009.01)

(58) Field of Classification Search
CPC ... H04L 41/147; H04L 67/55; H04L 12/1407; H04L 41/0613; H04L 41/0622; H04L 41/0806; H04L 41/0894; H04L 41/0895; H04L 41/142; H04L 41/40; H04L 41/5009; H04L 41/5032; H04L 43/0823; H04L 43/20; H04L 41/0631; H04L 41/082; H04L 41/0853; H04L 41/122; H04L 43/02; H04L 43/028; H04L 45/74; H04W 24/10; H04W 36/0085; H04W 24/04; H04W 24/08; H04W 8/02; H04W 8/18; H04W 12/033; H04W 12/106; H04W 24/02; H04W 28/0268; H04W 8/08; H04W 12/009; H04W 12/037; H04W 12/041; H04W 12/0431; H04W 12/08; H04W 12/084; H04W 12/108
See application file for complete search history.

(56) References Cited

U.S. PATENT DOCUMENTS

| | | | | |
|---|---|---|---|---|
| 2020/0076709 | A1* | 3/2020 | Stenberg | H04L 67/1008 |
| 2020/0112907 | A1* | 4/2020 | Dao | H04M 15/8016 |
| 2020/0252813 | A1* | 8/2020 | Li | H04L 41/14 |
| 2020/0322821 | A1* | 10/2020 | Lee | H04L 65/1073 |
| 2021/0022022 | A1* | 1/2021 | Guo | H04W 4/029 |
| 2021/0076320 | A1* | 3/2021 | Park | H04L 69/322 |
| 2021/0176650 | A1* | 6/2021 | Wang | H04W 8/14 |
| 2022/0201534 | A1* | 6/2022 | Wang | H04W 28/0284 |
| 2022/0272010 | A1* | 8/2022 | Marquezan | H04W 24/08 |
| 2022/0303187 | A1* | 9/2022 | Shariat | H04L 41/14 |
| 2022/0330085 | A1* | 10/2022 | Li | H04L 67/565 |
| 2022/0337486 | A1* | 10/2022 | Hong | H04L 41/024 |
| 2023/0036465 | A1* | 2/2023 | Mattsson | H04W 8/005 |

OTHER PUBLICATIONS

PCT/EP2020/050102, "Notification of Transmittal of the International Search Report and the Written Opinion of the International Searching Authority, or the Declaration", Sep. 16, 2020, pp. 1-17.
3GPP, "3rd Generation Partnership Project; Technical Specification Group Services and System Aspects; Study on Enablers for Network Automation for 5G-phase 2 (Release 17)", 3GPP TR 23.700-91 V0.2.0, Dec. 2019, pp. 1-19.

* cited by examiner

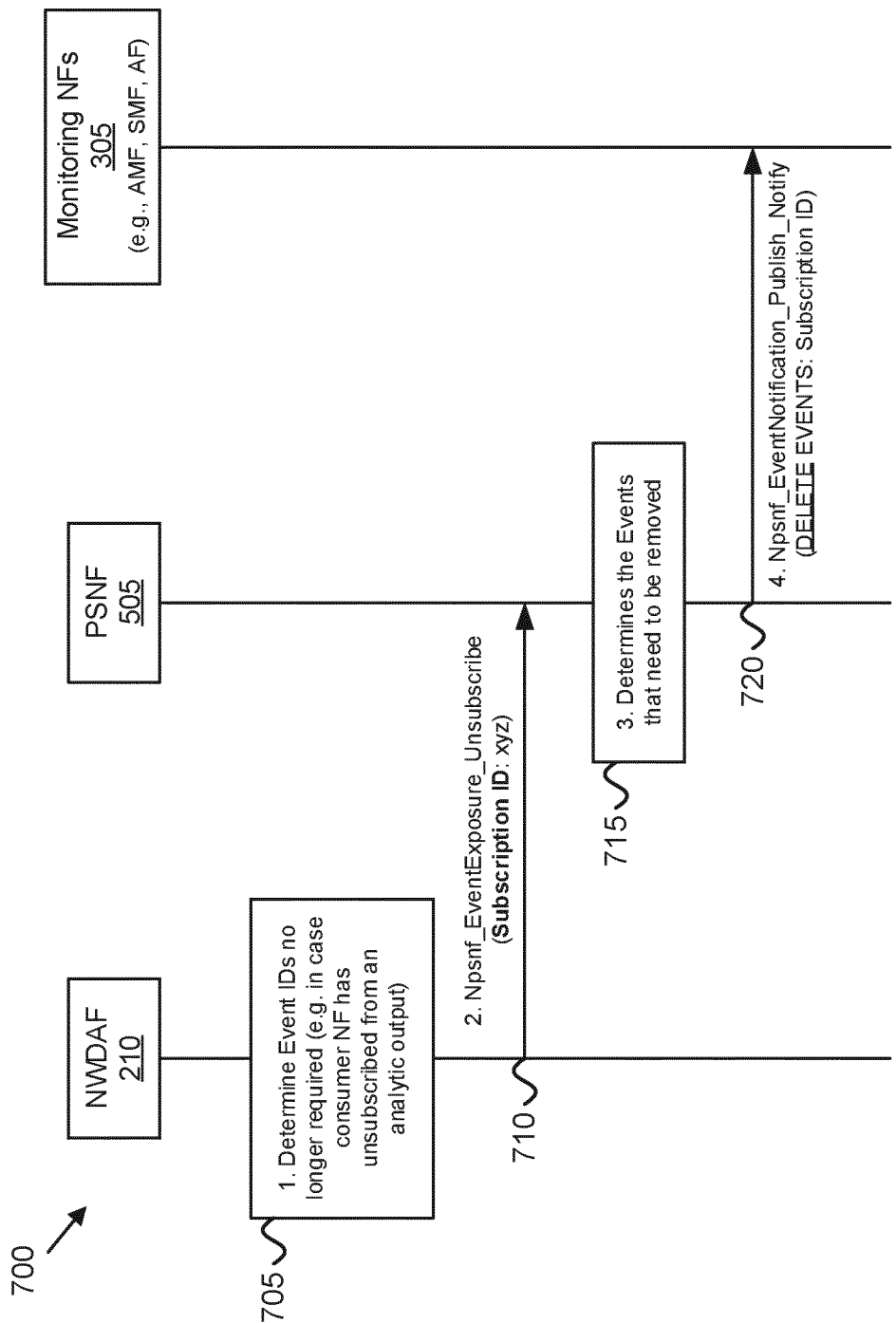

REPORTING OCCURRENCE OF AN EVENT IN A MOBILE COMMUNICATION NETWORK

The subject matter disclosed herein relates generally to wireless communications and more particularly relates to network data analytics.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Access Point Name ("APN"), Access Stratum ("AS"), Application Programing Interface ("API"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Operations, Administration and Maintenance ("OAM"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Single Network Slice Selection Assistance Information ("S-NSSAI"), Serving Gateway ("SGW"), Session Management Function ("SMF"), Tracking Area Identifier ("TAI"), Transmission Control Protocol ("TCP"), Transmit ("Tx"), Unified Data Management ("UDM"), User Entity/Equipment (Mobile Terminal) ("UE"), Uplink ("UL"), User Plane ("UP"), Universal Mobile Telecommunications System ("UMTS"), User Datagram Protocol ("UDP"), Wireless Local Area Network ("WLAN"), and Worldwide Interoperability for Microwave Access ("WiMAX").

In certain mobile communication networks, network data analytics may be performed by a Network Data Analytics Function ("NWDAF"). The NWDAF is used for data collection and data analytics in centralized manner. An NWDAF derives analytics based on information collected by other NFs and may be used for analytics for one or more Network Slice deployments.

When the analytics requested at the NWDAF target a specific UE, the NWDAF needs to track the NF serving the UE as the UE may change serving NF (e.g. AMF change during UE registration update due to mobility). When the serving NF changes the NWDAF would need to establish a new Event Notification Subscribe/Notify service with the new NF and cancel the existing Event Notification service from the old NF.

BRIEF SUMMARY

Methods for data collection are disclosed. Apparatuses and systems also perform the functions of the methods.

One method of a data collection function includes receiving a first request from a network analytics function (e.g., a NWDAF) to monitor and report occurrence of a first event, identifying a first type of network function (e.g., AMF, SMF, PCF, etc.) in a mobile communication network (e.g., a PLMN) that reports occurrence of the first event, sending a second request to at least one network function of the first type to monitor and report occurrence of the first event, and relaying one or more reports of occurrence of monitoring events from the at least one network function to the network analytics function.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a signal flow diagram illustrating another embodiment of a procedure for notifying a NF to stop publishing data corresponding to events;

DETAILED DESCRIPTION

Figure 1:
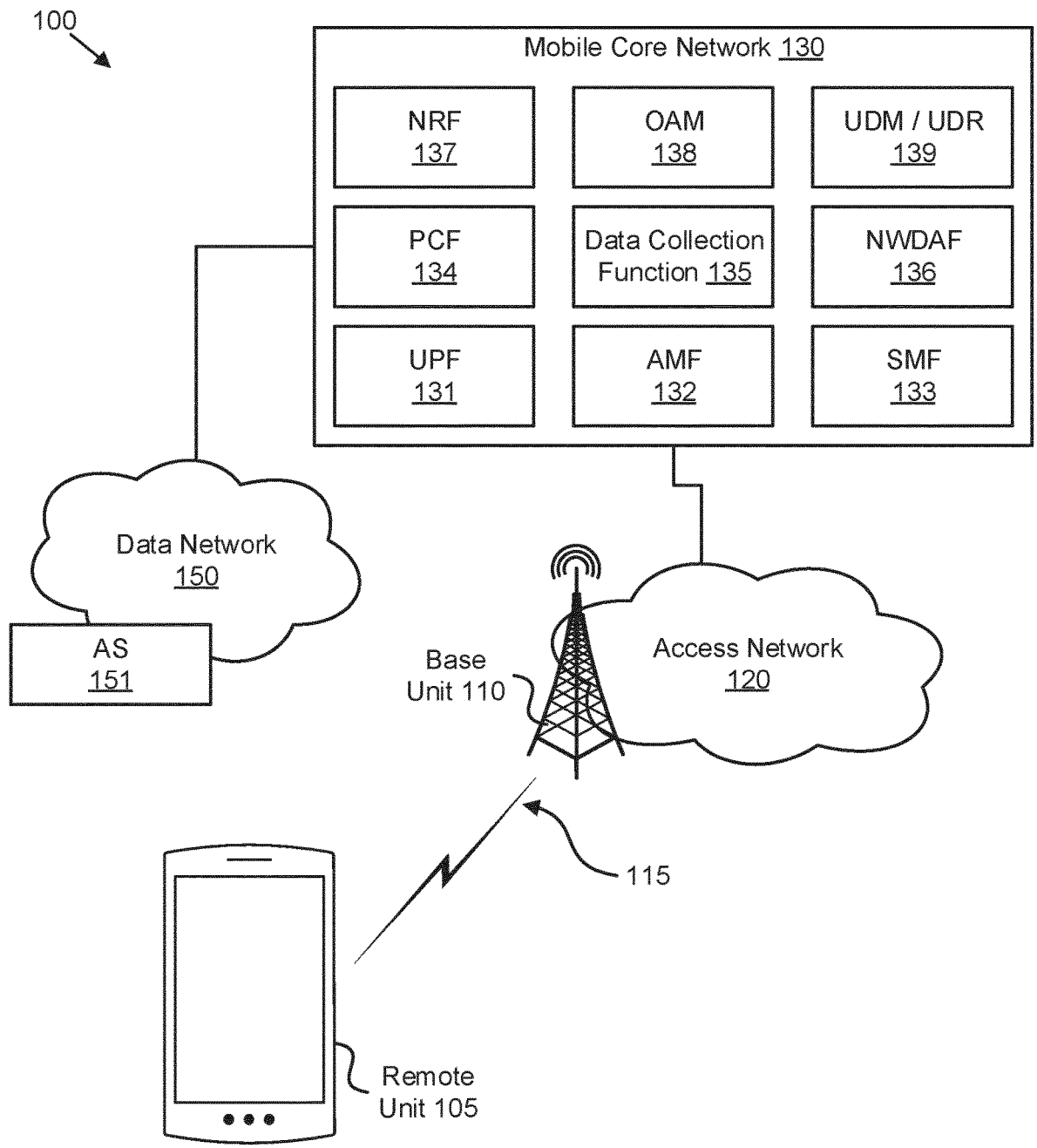
FIG. 1 is a diagram illustrating one embodiment of a wireless communication system for data collection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-largescale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for data collection, specifically for the reporting of occurrence of an event in a mobile communication network. As discussed above, the mobile communication network may deploy an NWDAF that derives analytics based on information collected by other NFs. The NWDAF derives analytics based on an NF request (Consumer NF). For example, a consumer NF (or AF) may request analytics information and prove an analytic ID and parameters with the request. A Consumer NF may ask analytics either in form of statistics or predictions.

The NWDAF derives the analytics by collecting relevant data from NFs. Candidate NFs include application functions, network exposure functions, control plane NFs, user plane functions, OAM, and the like. For example, the NWDAF derives statistics or predictions for UE location by collecting location changes events from the AMF. The NWDAF retrieves the related data from the NFs by using the Event Exposure Subscribe/Notify service operation. The NWDAF subscribes from the NF to retrieve specific data by including an Event ID (e.g. Location Changes). The NF/AFs then Notifies the NWDAF when the "Event" took place. For example, an AMF NF notifies the NWDAF that the UE location changed. The NWDAF uses various data processing techniques to derive analytics information from the collected data and reports the analytics to the requesting NF.

Currently the NWDAF collects the data to derive analytics directly from NFs that contain the relevant information by using the Event Notification Subscribe/Notify service operation. When the analytics requested at the NWDAF target a specific UE, the NWDAF needs to track the NF serving the UE as the UE may change serving NF (e.g. AMF change during UE registration update due to mobility). When the serving NF changes the NWDAF would need to establish a new Event Notification Subscribe/Notify service with the new NF and cancel the existing Event Notification service from the old NF.

However, such process creates the following issues: 1) it increases the complexity of the NWDAF in identifying and tracking NF(s) that contain the required data; and 2) it increases the signaling between the NWDAF and NFs when the NF that contains the required data changes.

An example of such inefficiency in signaling is the case where the NWDAF provides analytics for Observed Service Experience. In such a case the NWDAF would need to collect information from multiple NFs. If one or more of those NFs serving the UE change, the signaling exchange between the NWDAF and NFs increases considerably.

Currently, when an AF is an external entity to a PLMN the interaction between the AF and the network is via a network exposure function (NEF). The Network Exposure Function (NEF) supports external exposure of capabilities of network functions including for monitoring occurrences of events. When an AF requests to monitor specific Events for a UE the AF subscribes to the NEF including a list of one or more Events. The NEF in turn subscribes to the UDM as described in section 4.15.3.2.3 including a list of Events provided by the AF. The UDM then may subscribe to other Network Functions (e.g. AMF) to monitor Events that such network function can provide.

Such procedure does not improve the signaling efficiency as it requires further interaction between NEF, UDM and other NFs that monitor and report occurrence of Events requested by the NWDAF. In addition, it increases the load at the UDM as the UDM would need to handle subscriptions to multiple NF types.

To remedy the above, a centralized data collection function (DCNF) collects from the Network Functions the data required by the NWDAF to derive analytics. In various embodiments, the DCNF is part of the NWDAF architecture and can be collocated with the NWDAF or deployed separately.

FIG. 1 depicts a wireless communication system 100 for data collection, according to embodiments of the disclosure. In one embodiment, the wireless communication system 100 includes at least one remote unit 105, at least one base unit 110, at least one access network ("AN") 120, and a mobile core network 130 in a PLMN. The AN 120 may be composed of at least one base unit 110. The remote unit 105 may communicate with the access network 120 using 3GPP communication links and/or non-3GPP communication links, according to a radio access technology deployed by the AN 120. Even though a specific number of remote units 105, base units 110, ANs 120, and mobile core networks 130 are depicted in FIG. 1, one of skill in the art will recognize that any number of remote units 105, base units 110, ANs 120, and mobile core networks 130 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the access network 120 via uplink ("UL") and downlink ("DL") communication signals. Furthermore, the UL and DL communication signals may be carried over the communication links 115. Note, that the access network 120 is an intermediate network that provide the remote units 105 with access to the mobile core network 130.

In some embodiments, the remote units 105 communicate with an application server 151 (or other communication peer) via a network connection with the mobile core network 130. For example, an application in a remote unit 105 (e.g., web browser, media client, telephone/VoIP application) may trigger the remote unit 105 to establish a PDU session (or other data connection) with the mobile core network 130 using the access network 120. The mobile core network 130 then relays traffic between the remote unit 105 and the application server 151 (e.g., in the data network 150) using the PDU session. Note that the remote unit 105 may establish one or more PDU sessions (or other data connections) with the mobile core network 130. As such, the remote unit 105 may have at least one PDU session for communicating with the data network 150. The remote unit 105 may establish additional PDU sessions for communicating with other data networks and/or other communication peers.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of radio access network are not illustrated but are well known generally by those having ordinary skill in the art. The base units 110 connect to the mobile core network 130 via the access network 120.

The base units 110 may serve a number of remote units 105 within a serving area, for example, a cell or a cell sector, via a communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core ("5GC") or an evolved packet core ("EPC"), which may be coupled to a data network (e.g., the data network 150, such as the Internet and private data networks, among other data networks). A remote unit 105 may have a subscription or other account with the mobile core network 130. The present disclosure is not intended to be limited to the implementation of any particular wireless communication system architecture or protocol.

The mobile core network 130 includes several network functions ("NFs"). As depicted, the mobile core network 130 includes at least one user plane function ("UPF") 131 that serves the access network 120. The mobile core network 130 also includes multiple control plane functions including, but not limited to, an Access and Mobility Management Function ("AMF") 132, a Session Management Function ("SMF") 133, a Policy Control Function ("PCF") 134, a Network Repository Function ("NRF") 137 (used by the various NFs to discover and communicate with each other over APIs), and a Unified Data Management function ("UDM") 139. In certain embodiments, the mobile core network 130 may also include, an Authentication Server Function ("AUSF"), or other NFs defined for the 5GC.

The mobile core network 140 also includes a data collection function 135, a NWDAF 136, and an OAM function 138. The data collection function 135 acts as the central data storage that collects from the Network Functions the data required by the NWDAF 136 to derive analytics. While depicted as separate from the NWDAF 136, in certain embodiments the data collection function 135 is collocated with the NWDAF 136.

In various embodiments, the mobile core network 130 support different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM 139. In another example, each network slice includes an AMF, an SMF and a UPF. Although specific numbers and types of network functions are depicted in FIG. 1, one of skill in the art will recognize that any number and type of network functions may be included in the mobile core network 130.

To resolve the drawbacks of data collection by a NWDAF 136 described above, this disclosure proposes a more efficient method for the NWDAF to collect data from other NFs. Specifically, the data collection function 135 subscribed to various NFs to collect data, as described in detail below.

Figure 2A:
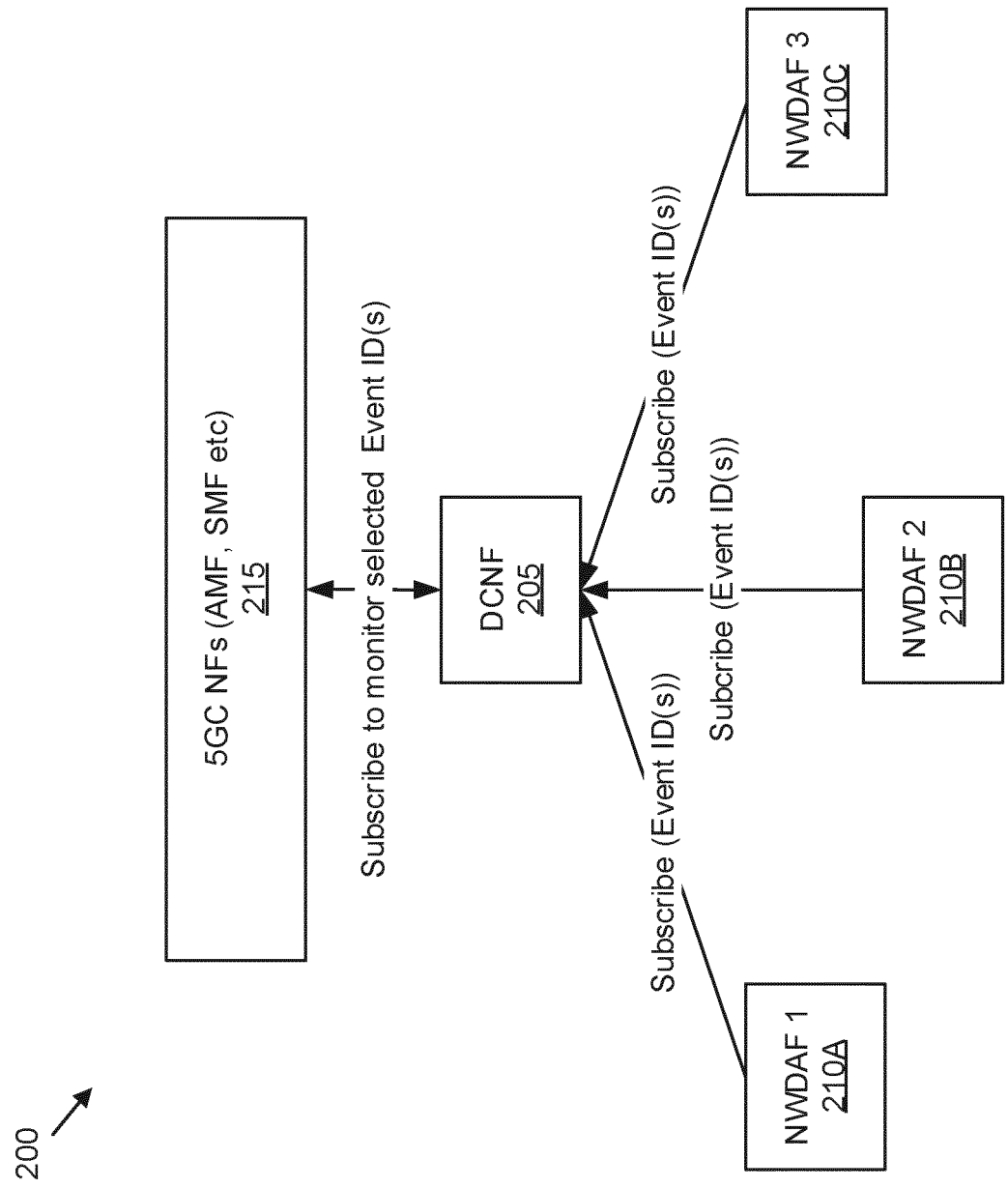
FIG. 2A is a diagram illustrating one embodiment of a network deployment for data collection utilizing a central data collection network function ("DCNF") and multiple NWDAFs.

FIG. 2A depicts a network deployment 200 for data collection, according to embodiments of the disclosure. The network deployment 200 includes a DCNF 205, which may be one embodiment of the data collection function 135. In the depicted embodiment, the network deployment 200 includes multiple NWDAFs, specifically a first NWDAF ("NWDAF-1") 210A, a second NWDAF ("NWDAF-2") 210B, and a third NWDAF ("NWDAF-3") 210C— collectively referred to as NWDAFs 210. Each NWDAF 210 may be one embodiment of the NWDAF 136. Although a specific number of NWDAFs are shown, one skilled in the art would recognize that any number of NWDAFs may be deployed in the PLMN. The network deployment 200 also includes a plurality of 5G NFs 215 capable of providing data relating to various Event IDs.

As depicted in FIG. 2A, Network Functions provide the data required by the NWDAF 210 to derive analytics to the DCNF 205 (e.g., a centralized data collection function). While depicted as a separate deployment, the DCNF 205 may be collocated with one (or more) of the NWDAFs 210. The DCNF 205 subscribes to the 5G NFs 215 to monitor selected Event IDs. The NWDAFs 210 subscribe to the DCNF 205 using one or more Event IDs.

Figure 2B:
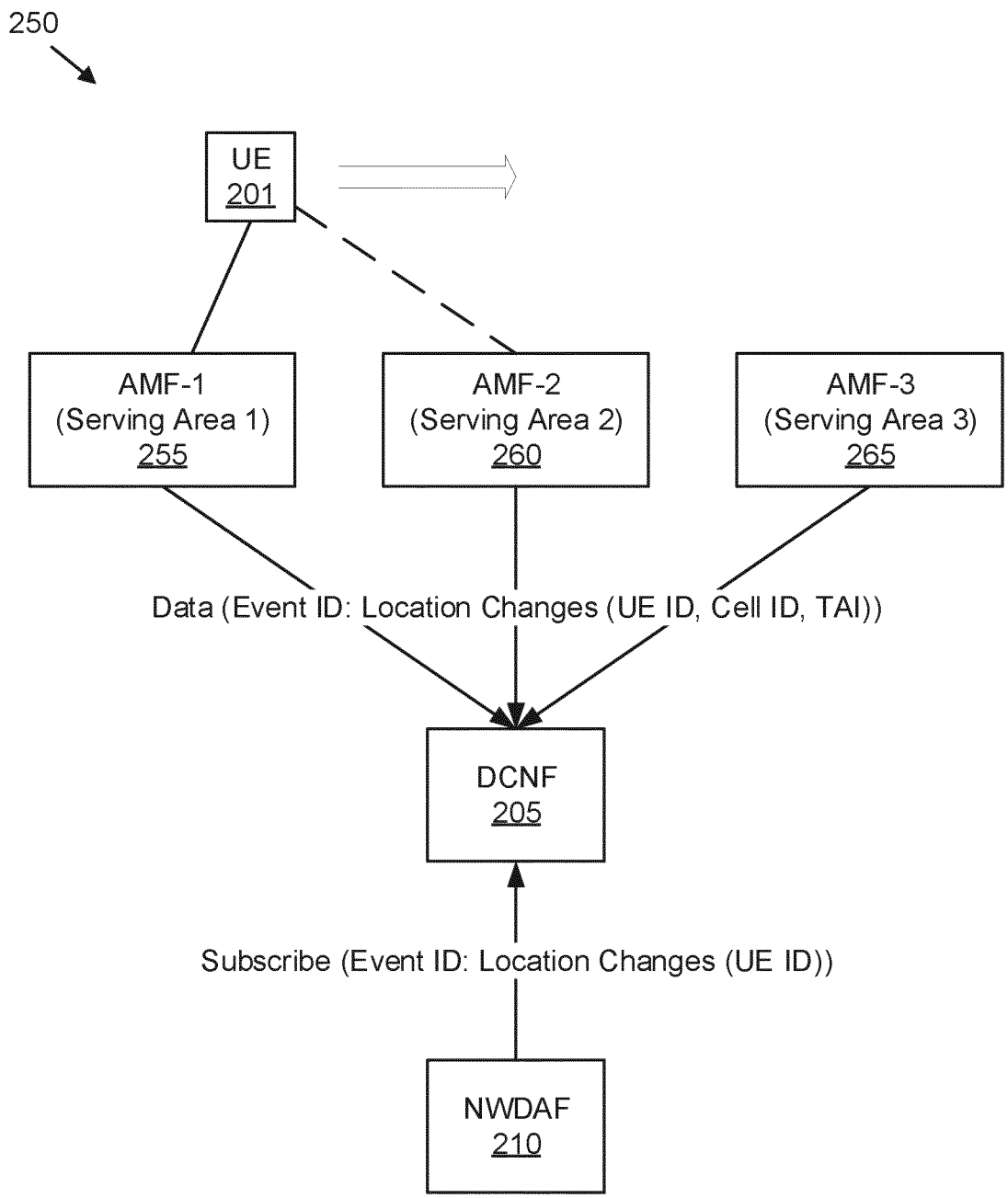
FIG. 2B is a diagram illustrating one embodiment of a network deployment for data collection utilizing a DCNF and multiple monitoring network functions ("NFs")

FIG. 2B depicts a network deployment 250 for data collection, according to embodiments of the disclosure. The network deployment 250 includes the DCNF 205 and a NWDAF 210. In the depicted embodiment, the network deployment 250 includes multiple AMFs, specifically a first AMF ("AMF-1") 255 corresponding to a first serving area, a second AMF ("AMF-2") 260 corresponding to a second serving area, and a third AMF ("AMF-3") 265 corresponding to a third serving area.

As depicted in FIG. 2B, the NWDAF 210 subscribes with the DCNF 205 for the Event ID "Location Changes" and may provide a specific UE ID (i.e., identifying the UE 201). To derive analytics on location changes, the NWDAF 210 requires location information from the AMF(s) serving the

201. Here, the UE 201 is currently attached to the first AMF 255, but UE mobility will cause handover of the UE 201 to the second AMF 260.

All AMFs in the PLMN provide location events to a single network function, here the DCNF 205. The NWDAF 210 subscribes with the DCNF 205 to retrieve the relevant data to derive analytics.

In various embodiments, the NWDAF 210 subscribes to the DCNF 205 with a list of one or more Events that the NWDAF 210 needs to be notified to derive analytics. The NWDAF 210 identifies the Events based on the Analytics request by a consumer NF. The DCNF 205 determines from the list of Events the NF types that needs to be contacted. Here, the identified NF type is "AMF" as the NWDAF 210 subscribes with the DCNF 205 for the Event ID "Location Changes". The DCNF 205 subscribes from each identified AMF with a corresponding list of one or more Events to be notified. In one embodiment, the DCNF 205 determines the NF types from the NRF 137. In another embodiment, each NF registers with the DCNF 205 or NRF 137 providing an NF profile of the Events supported. The DCNF 205 determines the NF type based on the NF profile. When an Event occurs, each NF that the DCNF 205 has subscribed to notifies the DCNF 205 with the data associated with the Event (e.g. TAI and Cell ID if the Event is Location Changes). The DCNF 205 relays the notification to the subscribed NWDAF 210.

Figure 3A:
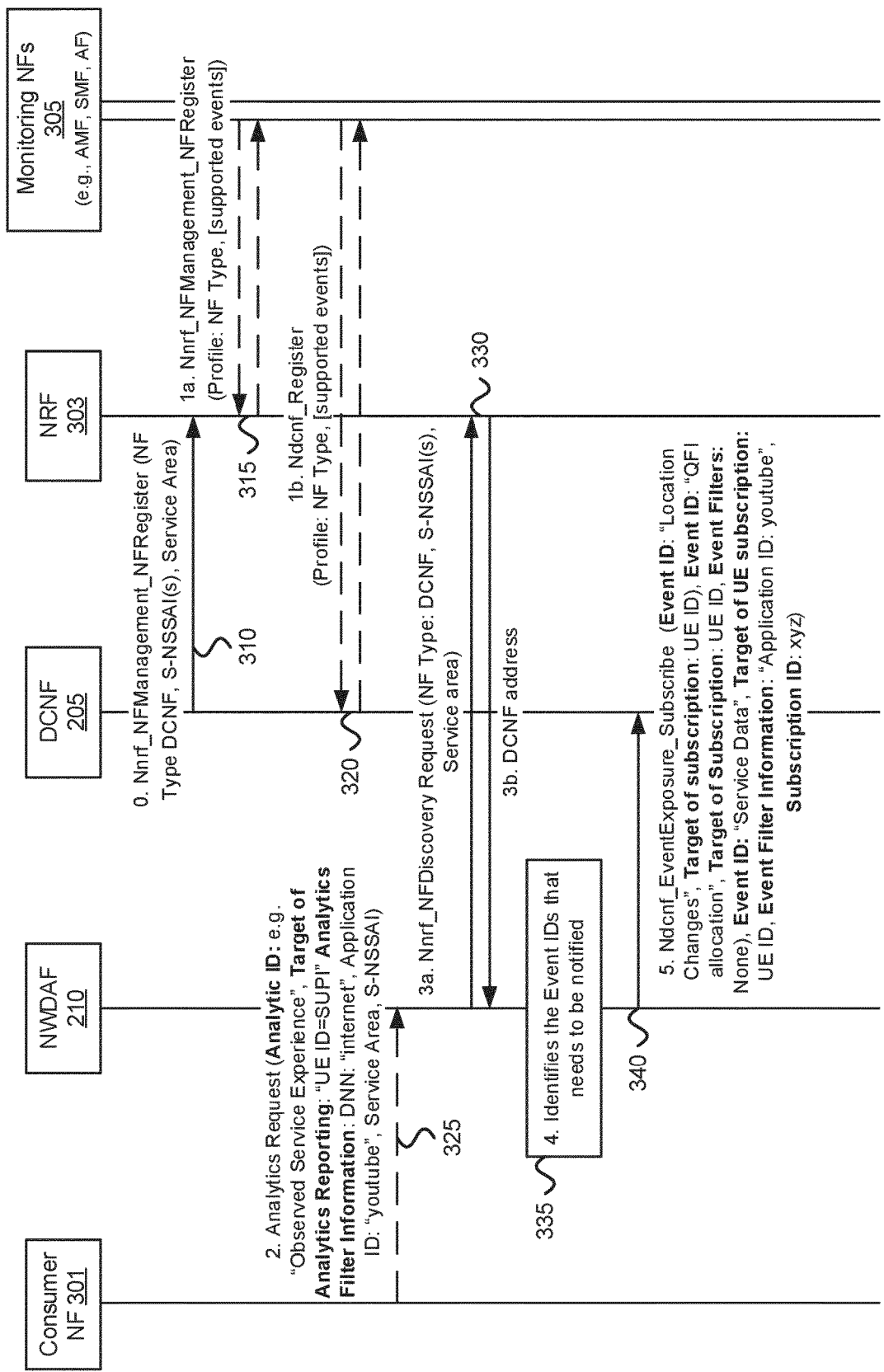
FIG. 3A is a signal flow diagram illustrating one embodiment of a procedure for data collection of occurrences of one or more events from monitoring NFs to a DCNF.
Figure 3B:
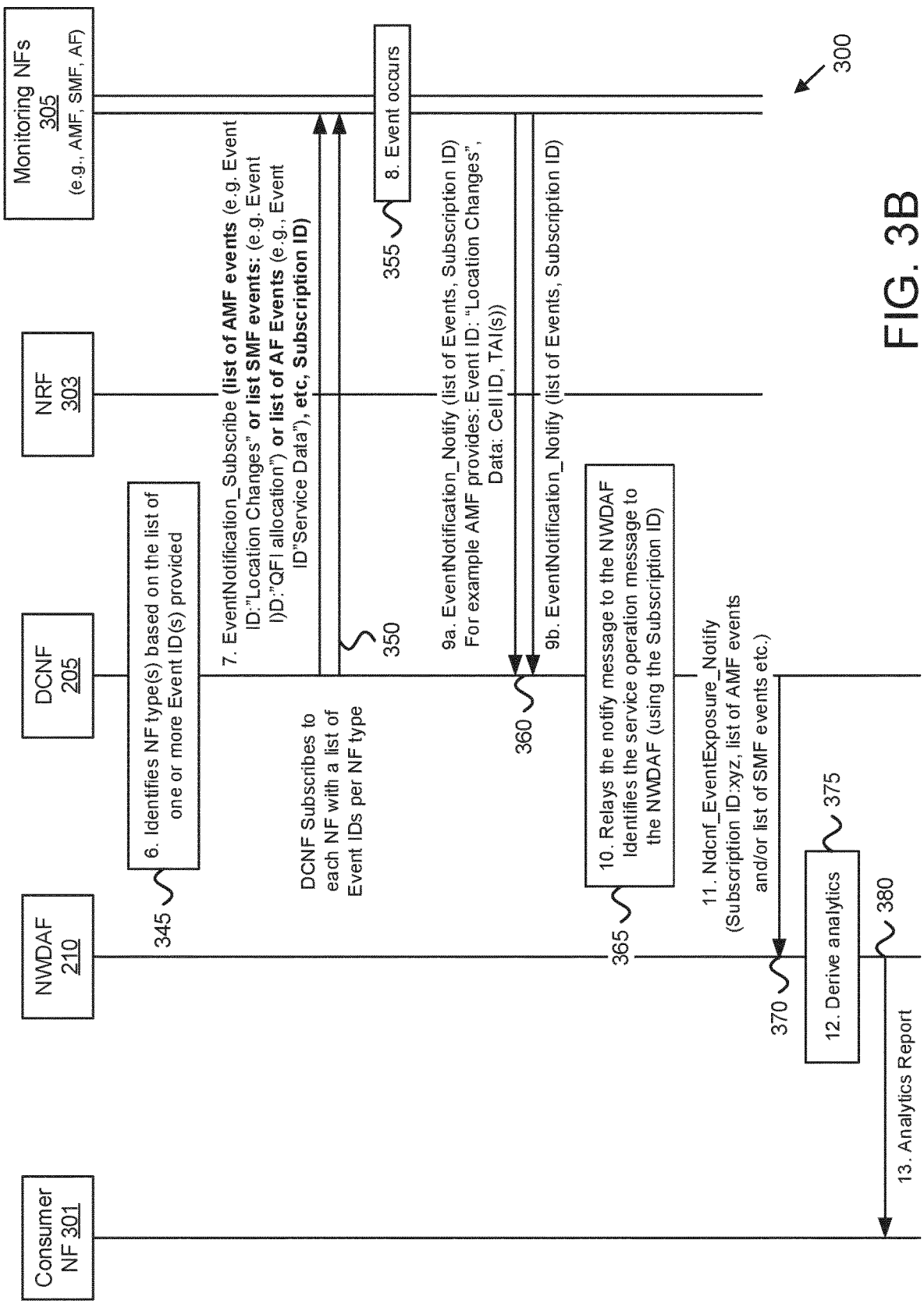
FIG. 3B is a continuation of the procedure depicted in FIG. 3A.

FIGS. 3A-3B depict a procedure 300 for data collection, according to embodiments of the disclosure. The procedure 300 involves a consumer NF 301 (e.g., a NF requesting analytic information), a NWDAF 210, a DCNF 205, an NRF 303, and one or more Monitoring NFs 305 (e.g., an AMF, SMF, AF, etc.). The procedure 300 details signaling flow for a DCNF 205 to subscribe to appropriate NFs responsive to a request from the NWDAF 210.

The procedure 300 begins at step 0 as the DCNF 205 registers with the NRF 303 (see messaging 310). The DCNF 205 may include in the registration request the Service Area supported (e.g. geographical area, or cell ID, TAI) and a list of S-NSSAI(s) indicating the network slices supported.

At optional step 1a, each NF 305 may register to the NRF 303 the Events supported (see messaging 315). Alternatively, at optional step 1b, each NF 305 may register with the DCNF 205, each NF 305 providing an NF Profile, the NF profiling containing the supported events (see messaging 320).

At step 2, the Consumer NF 301 requests from the NWDAF 210 to provide analytics (see messaging 325). For example, an NF may request analytics on Observed Service Experience for a specific UE (identified by a SUPI) that uses a specific application on a specific DNN. The request may indicate that the analytics should be filtered on a specific area of interest or specific network slices (S-NSSAIs).

At steps 3a and 3b, the NWDAF 210 discovers the DCNF 205 from the NRF 303 (see messaging 330). The NWDAF 210 may include in the request the Service Area and/or list of S-NSSAI(s) if the Analytics request in step 2 included this information.

At step 4, the NWDAF 210 identifies the Events that needs to be collected (see block 335). In various embodiments, each analytics request with specific analytic ID requires a specific list of one or more Event ID(s). In one embodiment, the NWDAF 210 identifier the Events as per 3GPP TS 23.288.

At step 5, the NWDAF 210 subscribes from the DCNF 205 (e.g., using the Event Exposure subscribe/notify service operation) a list of one or more Events (identified by Event ID(s), that need to be notified (see messaging 340). The NWDAF 210 may include an indication that the notification should be filtered in an area of interest or applicable only to specific network slices if such information was requested in step 2. The request also includes a subscription ID.

Continuing at FIG. 3B, at step 6, the DCNF 205 identifies the NF types that needs to be contacted based on the provided list of Event ID(s) (see block 345). In certain embodiments, the DCNF 205 may identify each NF type (e.g. AMF, SMF, PCF etc.) based on input from the NRF 303, using the information provided to the NRF in step 1a. For example, the DCNF 205 may receive a network function profile from the NRF 303 that indicates one or more Events the network function is able to monitor and report. In certain embodiments, the DCNF 205 may identify each NF type based in input provided by each NF in step 1b.

At step 7, the DCNF 205 subscribes to each identified NF type including a list of one or more Event ID(s) associated to the NF type (see messaging 350). In various embodiments, the DCNF 205 subscribes to all NFs 305 of specific NF type (e.g. if NF type is AMF the DCNF subscribes to all AMFs) which avoids the need to track what NF contains the required information (e.g. NF that serves a specific UE). The DCNF 205 may contact NFs of the NF type in a specific area of interest or a specific supported network slice (identified by S-NSSAI) if the request in step 5 included such information. The request also includes a Subscription ID that is used by the DCNF 205 to correlate this request with the subscription from the NWDAF 210 in step 5, that is, the DCNF 205 maintains a mapping of the subscription from the NWDAF 210 to the subscription(s) to each NF type.

At step 8, when an NF 305 identifies that an Event that the DCNF 205 has subscribed to, occurs, the NF notifies the DCNF 205 (see block 355). At step 9a and 9b, each NF 305 that the DCNF 205 has subscribed to provides a notification that an Event (identified by an Event ID) has occurred (see messaging 360). The notification includes the data associated with the Event ID and the subscription ID provided in step 7.

At step 10, the DCNF 205 relays the data provided by notifying the NWDAF 210 (see block 365). The DCNF 205 identifies the EventNotification subscription message using the Subscription ID. At step 11, the DCNF 205 notifies the NWDAF 210 with the relevant data (see messaging 370). At step 12, the NWDAF 210 builds analytics based on data collected (see block 375). At step 13, the NWDAF 210 provides an analytics report to the consumer NF 301 (see messaging 380).

Figure 4A:
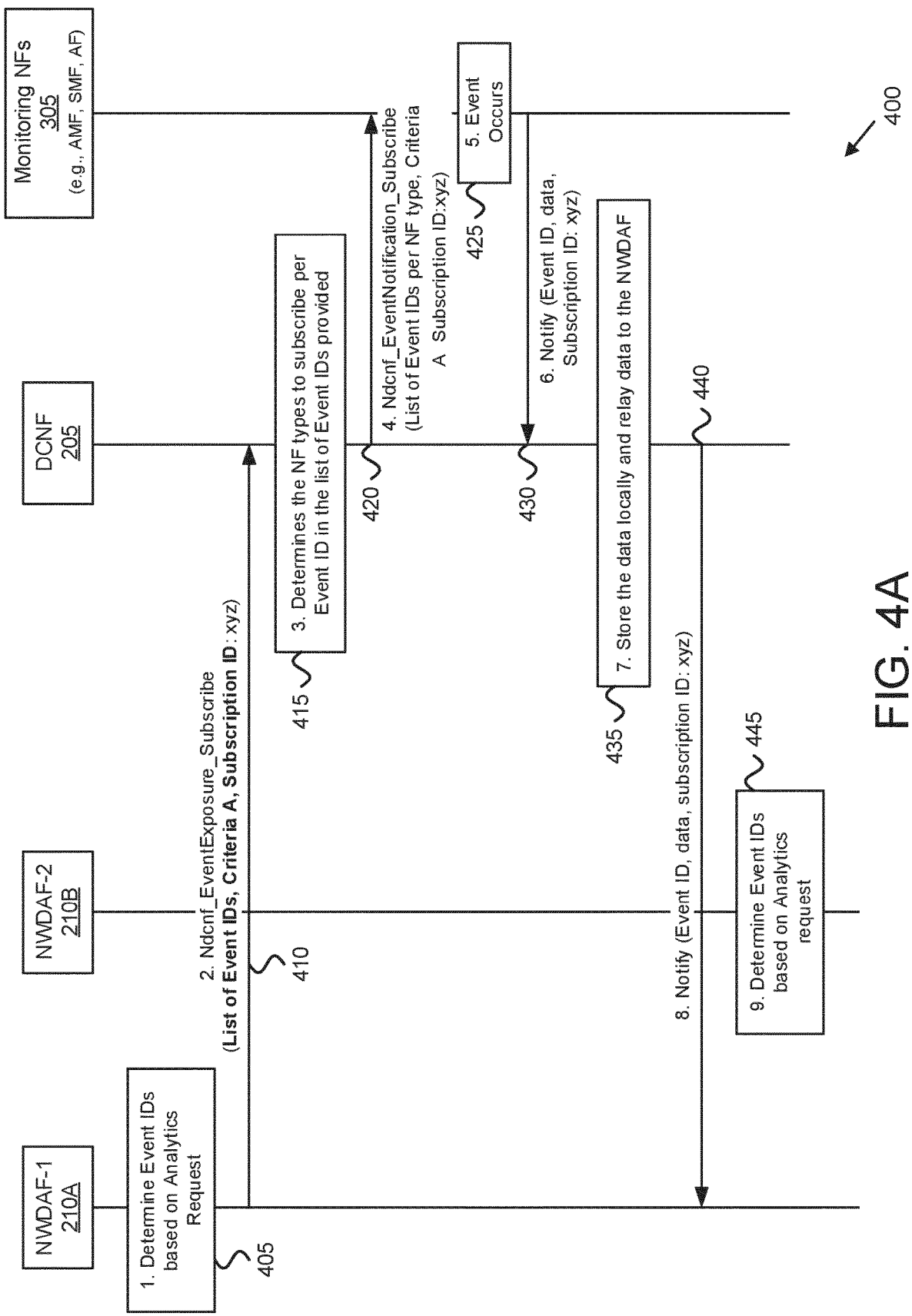
FIG. 4A is a signal flow diagram illustrating another embodiment of a procedure for support of multiple NWDAFs subscribing to DCNF with a list of Event ID(s)
Figure 4B:
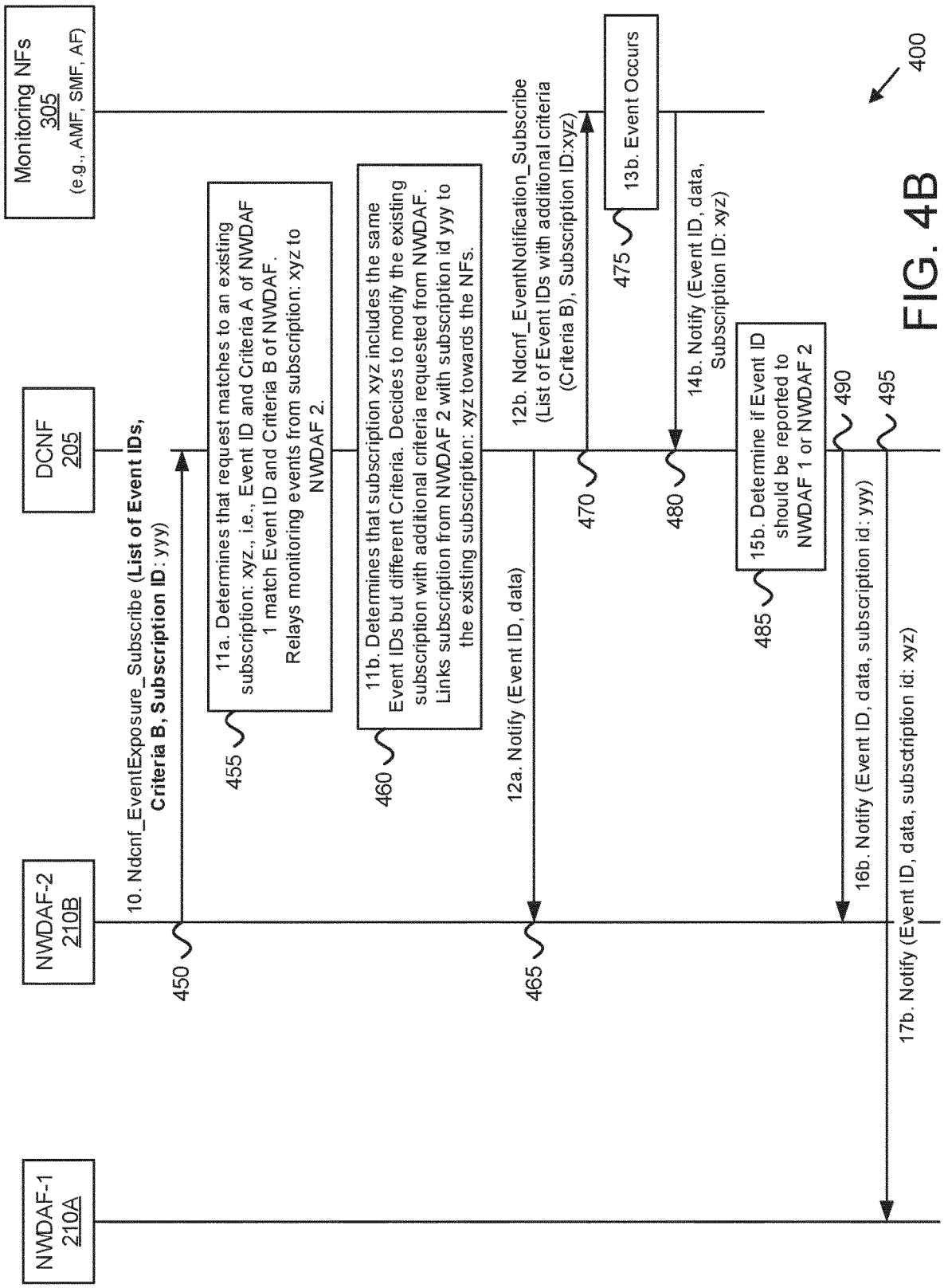
FIG. 4B is a continuation of the procedure depicted in FIG. 4A.

FIGS. 4A-4B depict a procedure 400 for data collection, according to embodiments of the disclosure. The procedure 400 involves the first NWDAF ("NWDAF-1") 210A, the second NWDAF ("NWDAF-2") 210B, the DCNF 205, and the one or more monitoring NFs 305.

The procedure 400 details signaling flow for the situation where multiple NWDAFs are deployed such that the DCNF 205 may receive subscription to report one or more Events from multiple NWDAFs of the same PLMN. In such a case, if the DCNF 205 determines that Events requested by multiple NWDAFs are identical, i.e. target the same UE(s) or target the same area of interest, the DCNF 205 may decide to use an existing Event Notification subscription to each network function of the same NF type to relay the information to multiple NWDAFs.

In some embodiments, the DCNF 205 identifies that additional subscriptions are not required based on the information included in the subscription request by each NWDAF 210. The DCNF 205 may determine that additional subscription requests to network functions are not required if the request from a second NWDAF 210B matches the request from the first NWDAF 210A. For example, when an Event ID and its contents from a list of Event IDs requested by a second NWDAF 210B matches an Event ID and its contest from a request from a first NWDAF 210A, i.e. when the Targets of Subscription and Event Filter information contained in the requests match.

In other embodiments, the DCNF 205 may determine to modify an existing Event Notification subscription towards network functions when a second NWDAF 210B subscribes to a same Event subscribed by a first NWDAF 210A but contains different criteria, e.g., the second NWDAF 210B subscribes to be notified of Events targeting a different UE and/or targeting a different service area and/or different DNN, S-NSSAI, application). In such a case, the DCNF 205 modifies an existing Event Notification subscription to NFs 305 of the same NF type requesting additional criteria to be reported from the same Event. The DCNF 205 identifies what NWDAFs needs to be notified of an Event reported by each NF 305 based on the criteria required by each NWDAF (e.g. based on SUPI of UE or an area of interest).

In another embodiment, the DCNF 205 may determine to modify an existing Event subscription towards one or more network functions of the same NF type when a second NWDAF 210B subscribes to a list of one or more Event that can be provided by the same NF types. For example, the DCNF 205 may have an existing Event Subscription with an AMF 132 providing notifications of Event ID "Location Changes". When a second NWDAF 210B subscribes to the DCNF 205 to be informed of notifications of Event ID "Reachability Status" changes, the DCNF 205 may modify an existing event subscription to all NFs 305 of the same NF type adding the additional Event ID "Reachability Status" to be reported to the DCNF 205. The DCNF 205 then identifies what NWDAF needs to be notified of an Event reported by each NF 305 based on the Event ID of the Event.

The procedure 400 begins at step 1 as the first NWDAF 210A identifies the Events that needs to be collected (see block 405). In various embodiments, each analytics request with specific analytic ID requires a specific list of one or more Event ID(s). In one embodiment, the first NWDAF 210A identifier the Events as per 3GPP TS 23.288.

At step 2, the first NWDAF 210A subscribes from the DCNF 205 (e.g., using the Event Exposure subscribe/notify service operation) a list of one or more Events (identified by Event ID(s), that need to be notified (see messaging 410). The first NWDAF 210A may include an indication that the notification should be filtered in an area of interest or applicable only to specific network slices, if requested by a consumer AF, as described above. The request also includes a subscription ID.

At step 3, the DCNF 205 identifies the NF types that need to be contacted based on the provided list of Event ID(s) (see block 415). In certain embodiments, the DCNF 205 uses a network function profile to determine what types of NFs are needed, as described above.

At step 4, the DCNF 205 subscribes to each identified NF type including a list of one or more Event ID(s) associated to the NF type (see messaging 420). In various embodiments, the DCNF 205 subscribes to all NFs 305 of specific NF type (e.g. if NF type is AMF the DCNF subscribes to all AMFs) which avoids the need to track what NF contains the required information (e.g. NF that serves a specific UE). The DCNF 205 may contact NFs of the NF type in a specific area of interest or a specific supported network slice (identified by S-NSSAI) if the request in step 2 included such information. The request also includes a Subscription ID that is used by the DCNF 205 to correlate this request with the subscription from the first NWDAF 210A in step 2, that is, the DCNF 205 maintains a mapping of the subscription from the first NWDAF 210A to the subscription(s) to each NF type.

At step 5, when an NF 305 identifies that an Event that the DCNF 205 has subscribed to, occurs, the NF notifies the DCNF 205 (see block 425). At step 6, each NF 305 that the DCNF 205 has subscribed to provides a notification that an Event (identified by an Event ID) has occurred (see messaging 430). The notification includes the data associated with the Event ID and the subscription ID provided in step 4.

At step 7, the DCNF 205 relays the data provided by notifying the NWDAF 210 (see block 435). The DCNF 205 identifies the EventNotification subscription message using the Subscription ID. At step 8, the DCNF 205 notifies the first NWDAF 210A with the relevant data (see messaging 440).

At step 9, at some point a second NWDAF 210B may receive a request to provide analytics output (see block 445). The second NWDAF 210B determines the Events required, as described above in step 1.

Continuing at FIG. 4B, at step 10, the second NWDAF 210B subscribes from the DCNF with a list of one or more Events to be reported (see messaging 450). The second NWDAF 210B uses the same procedure described above at step 2, but has a different subscription ID and may include different criteria.

Depending on the similarity between the list of one or more Events to be reported to each NWDAF (and/or the similarity of the criteria included in the subscription request in steps 2 and 10), the DCNF 205 either implements steps 11a-12a or implements steps 11b-17b.

At step 11a, the DCNF 205 determines that the request from the second NWDAF 210B matches to the request from the first NWDAF 210A, i.e., the criteria for the Event ID(s) requested by the second NWDAF 210B match the criteria for the Event ID(s) requested by first NWDAF 210A. The DCNF in such a case does not create a new subscription request to each NF of the same NF type to monitor and report occurrence of such Event but relays reports of occurrence of events from an existing subscription between the DCNF and NFs (e.g. subscription of step 6). The DCNF may also provide any data of the matched Event that is locally available to the second NWDAF 210B (see block 455)

At step 11b, the DCNF 205 determines that the request from the second NWDAF 210B can be supported by an existing Event Notification Subscription towards specific NF types. For example, the DCNF 205 may determine that the request from the second NWDAF 210B requires the same Events to be reported as with the first NWDAF 210A but contains different criteria (i.e. targets different UEs or different service area), or the request from the second NWDAF 210B requires Events that can be reported by the same NF types that the DCNF 205 has an existing subscription with. (see block 460)

At step 12a, the DCNF 205 sends a Notification to the second NWDAF 210B with the relayed and/or locally available data (see messaging 465).

Alternatively, at step 12b the DCNF 205 modifies the existing subscription towards NFs of the same NF type requesting additional criteria of the same Event or additional Events to be reported (see messaging 470). At step 13b, an event occurs (see block 475). At step 14b, each NF 305 notifies the Event at the DCNF (see messaging 480).

At step 15b, the DCNF 205 determines if the Event reported should be relayed to the first NWDAF 210A or second NWDAF 210B (see block 485). The DCNF 205 determines the NWDAF to relay the reported event based on the subscription ID of the Event Notification subscription towards each NF 305 and/or the Event ID of the reported Event, and/or the target of subscription (e.g. SUPI) of the reported event and/or one or more Event Filters of the reported event.

At step 16b, the DCNF 205 relays the reported Event to the first NWDAF 210A (see messaging 490). At step 17b, the DCNF 205 relays the reported Event to the second NWDAF 210B (see messaging 495).

Figure 5:
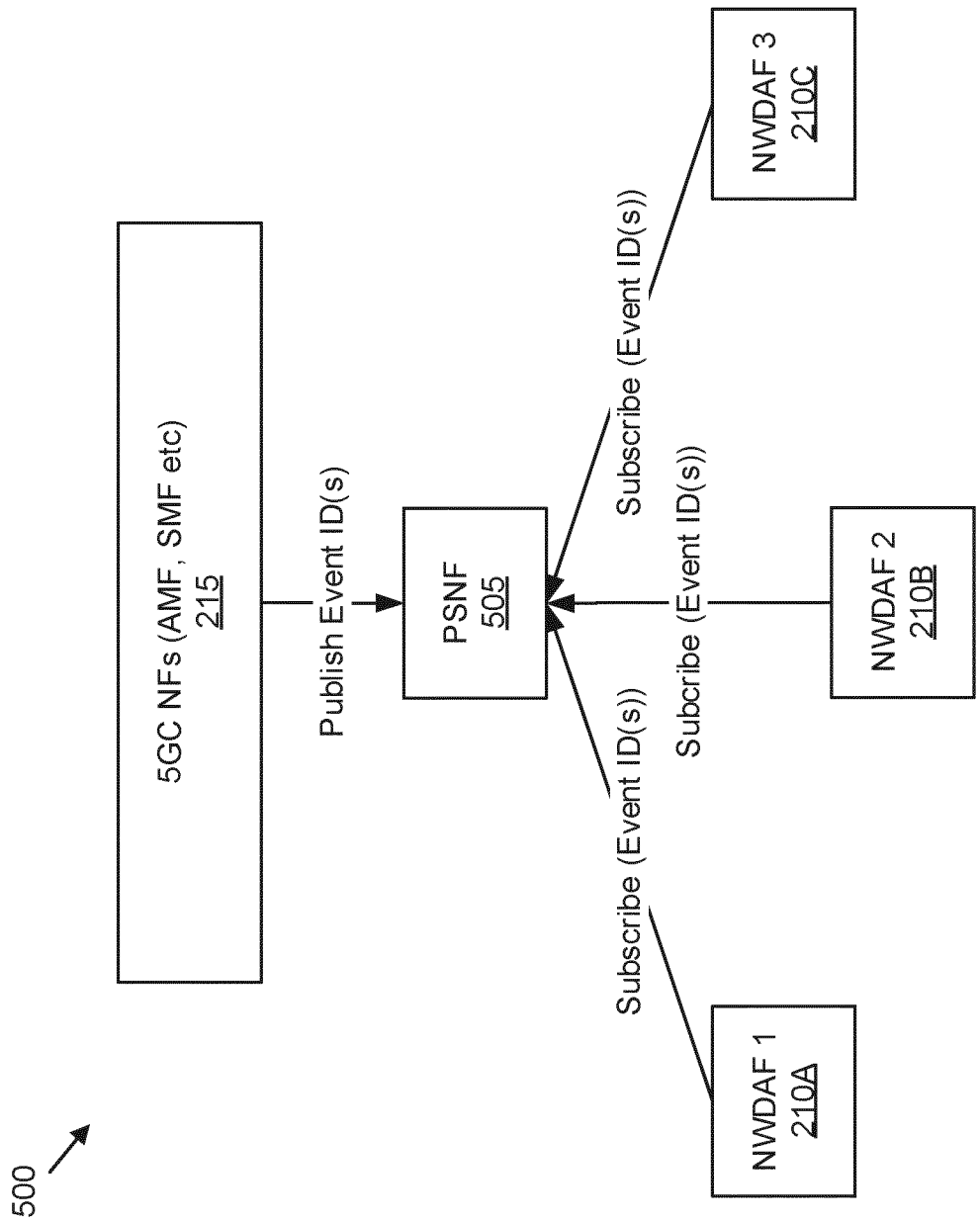
FIG. 5 is a diagram illustrating one embodiment of a network deployment for data collection utilizing a publication/subscription network function ("PSNF")

FIG. 5 depicts a network deployment 500 comprising a data collection function operating according to a publication-subscription ("PubSub") model, according to embodiments of the disclosure. In the Pub Sub communication model, Pub Sub servers collect information from servers that publish data and provide the data to servers that subscribe to this information. Accordingly, publishers provide data to a data collection server corresponding to a Topic. Servers that are interested to this Topic subscribe from the data collection server to retrieve data corresponding to this topic. A data collection function operating according to the PubSub model is referred to herein as a PubSub Network Function ("PSNF").

The network deployment 500 includes a PSNF 505, which may be one embodiment of the data collection function 135 and/or DCNF 205. In the depicted embodiment, the network deployment 200 includes multiple NWDAFs, specifically the first NWDAF ("NWDAF-1") 210A, the second NWDAF ("NWDAF-2") 210B, and the third NWDAF ("NWDAF-3") 210C—collectively referred to as NWDAFs 210. Each NWDAF 210 may be one embodiment of the NWDAF 136. Although a specific number of NWDAFs are shown, one skilled in the art would recognize that any number of NWDAFs may be deployed in the PLMN. The network deployment 200 also includes a plurality of 5G NFs 215 capable of providing data relating to various Event IDs.

As depicted, each NF 215 subscribes to the PSNF 505, e.g., using a new Event Exposure Subscribe/Notify service operation to be notified on the events that need to be published. Each NWDAF 210 supports specific Analytics. A NWDAF 210, based on the supported Analytics derives the Events that needs to be collected. The NWDAF 210 subscribes to the PSNF 505 to retrieve data for specific Event IDs using the Event Exposure Subscribe/Notify service operation. NWDAF subscription to a PSNF 505 is described in greater detail below with reference to FIGS. 6A-6B. The PSNF 505 notifies the NFs 215 of the Events that need to be published. According to the PubSub model, the PSNF 505 notifies only the NFs 215 that have subscribed previously to the PSNF 505.

Figure 6A:
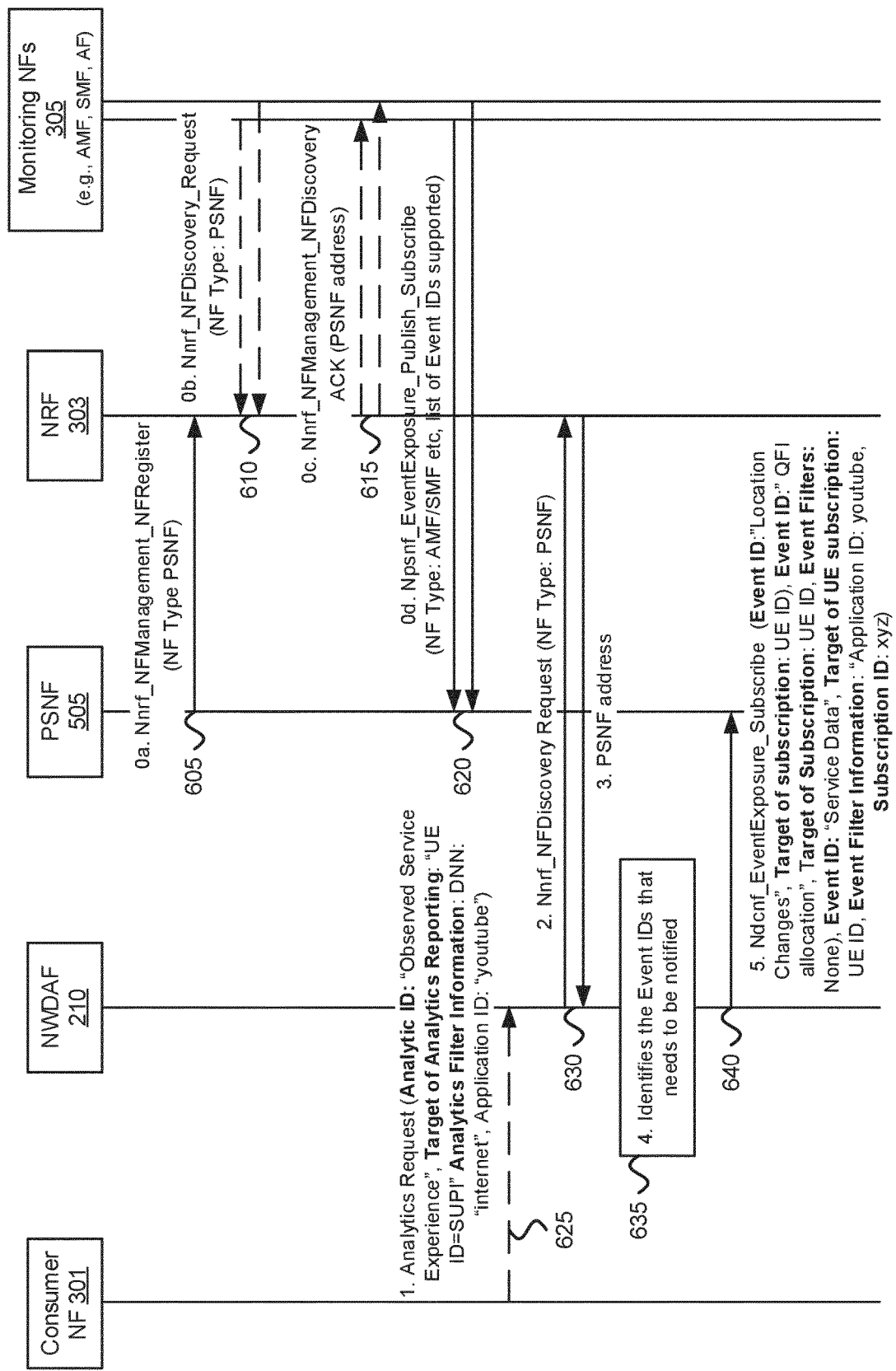
FIG. 6A is a signal flow diagram illustrating one embodiment of a procedure for NFs to publish data to a PSNF.
Figure 6B:
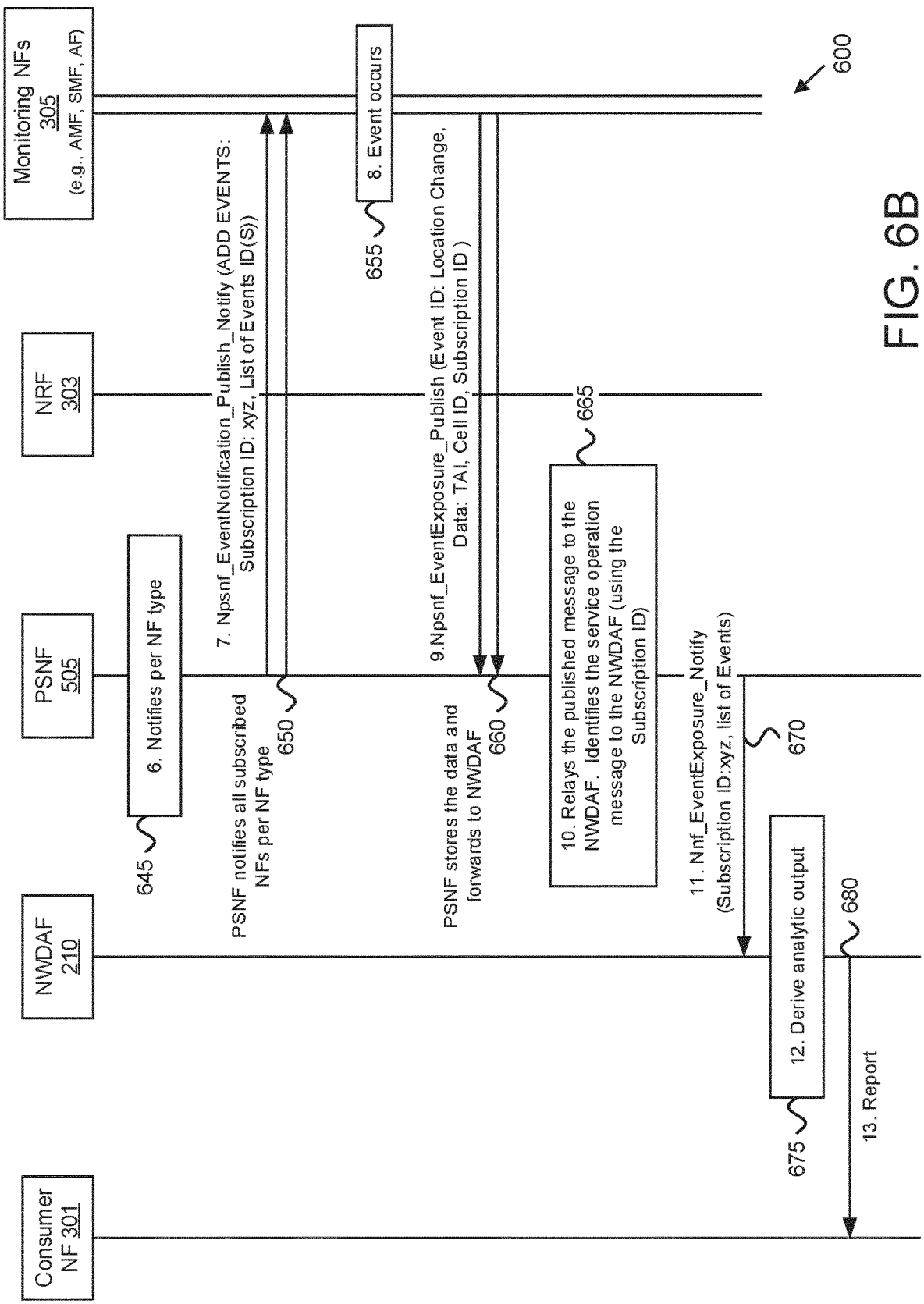
FIG. 6B is a continuation of the procedure depicted in FIG. 6A.

FIGS. 6A-6B depict a procedure 600 for data collection, according to embodiments of the disclosure. The procedure 600 involves the consumer NF 301, a NWDAF 210, the PSNF 505, the NRF 303, and the one or more monitoring NFs 305. The procedure 600 details signaling flow for the PubSub model approach. Each NF 305 publishes an Event that has occurred to the PubSub Network Function ("PSNF") 505, e.g., using a new service operation. Each NF 305 publishes Events to the PSNF 505 based on Events that the NWDAF 210 subscribes to from the PSNF 505.

The procedure 600 begins at step 0a as the PSNF 505 registers with the NRF 303 using existing Nnrf service operations (see messaging 605).

At step 0b, each NF 305 sends a discovery request to the NRF 303 using the existing Nnrf service operations (see messaging 610). At step 0c, the NRF 303 replies to the discovery requests with a network address of the PSNF 505 (see messaging 615).

At step 0d, each NF 305 subscribes from the PSNF 505 to be notified on Events that need to be published, e.g., using a new service operation (see messaging 620). Each NF 305 includes an NF profile that contains the NF type and may include a list of one or more Event ID supported.

At step 1, the consumer NF 301 requests from the NWDAF 210 to provide analytics. For example, an NF may request analytics on Observed Service Experience for a specific UE (identified by a SUFI) that uses a specific application on a specific DNN (see messaging 625)

At steps 2 and 3, NWDAF 210 discovers the PSNF 505 from the NRF 303 (see messaging 630). At step 4, the NWDAF 210 identifies the Events that needs to be notified (see block 635). In certain embodiments, the NWDAF 210 identifies the events as per 3GPP TS 23.288.

At step 5, the NWDAF 210 subscribes from the PSNF 505 (using the Event Exposure subscribe/notify service operation) the Events that need to be collected (see messaging 640). The NWDAF 210 includes in the request the Event IDs that need to be notified. The request to the PSNF 505 also includes a subscription ID that is used by the NWDAF 210 and PSNF 505 to identify how to correlate the data.

Continuing at FIG. 6B, at step 6 the PSNF 505 identifies the NF types that needs to be contacted based on the provided list of Event ID(s) (see block 645). The PSNF 505 identifies the NFs 305 that have subscribed to be notified of Events to Publish.

At step 7, the PSNF 505 notifies each NF 305 of the identified NF type and includes the corresponding list of one or more Event ID(s) (see messaging 650). The notification request may include information on the Events that need be ADDED. The notification requests also include a subscription ID.

At step 8, an Event occurs (see block 655). At step 9, when an Event occurs (according to the Event ID) each NFs 305 publishes the corresponding data to the PSNF 505 (see messaging 660). The publish request includes the Subscription ID of the corresponding message in step 7. At step 10, the PSNF 505 relays the data provided by notifying the NWDAF 210. The PSNF 505 identifies the EventNotification subscription message using the Subscription ID (see block 665).

At step 11, the PSNF 505 notifies the NWDAF 210 with the relevant data (see messaging 670). At step 12, the NWDAF 210 builds analytics based on data collected (see block 675). At step 13, the NWDAF 210 reports the analytics to the requesting NF, here the consumer NF 301 (see messaging 680).

FIG. 7 depicts a procedure 700 for unsubscribing from event reporting, according to embodiments of the disclosure. The procedure 700 involves the NWDAF 210, the PSNF 505, and one or more monitoring NFs 305. When an NF consumer unsubscribes from an analytics request the NWDAF may no longer need NFs to publish related data. In such a case the NWDAF unsubscribes from the PSNF to collect event IDs including in the request the corresponding subscription ID. The PSNF in turns notifies each NF with the Event IDs that need to be removed from the published information.

The procedure 700 begins at step 1 as the NWDAF 210 determines that data related to one or more Event IDs no longer needs to be collected (e.g. in case the NF consumer has unsubscribed from an analytics request) (see block 705).

At step 2, the NWDAF 210 identifies the Npsnf service operation (and the corresponding subscription ID) that contains the Event IDs that no longer are required. The NWDAF 210 sends an unsubscribe request including in the request the corresponding subscription ID (see messaging 710).

At step 3, the PSNF 505 determines the Event IDs associated to the subscription ID that are no longer required (see block 715). At step 4, the PSNF 505 sends a notify message to all NFs that have subscribed to be notified of information to be published (see messaging 720). The Notify message includes information on the Events that needs be removed (each Event is identified by a specific subscription ID). Note that support for multiple NWDAFs is applicable to the procedure 700. Specifically, the PSNF 505 may modify an existing subscription in response to a NWDAF sending an unsubscribe request, so that the Events are removed only when no NWDAF needs to collect data related to the Event ID.

Figure 8:
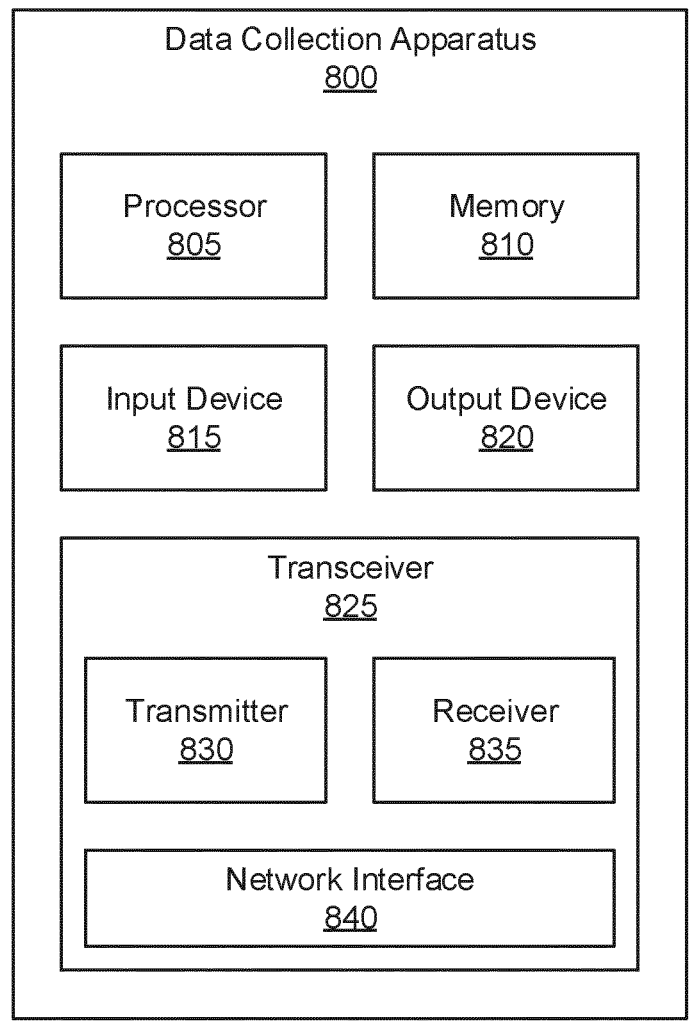
FIG. 8 is a block diagram illustrating one embodiment of a data collection apparatus.

FIG. 8 depicts one embodiment of a data collection apparatus 800 that may be used for data collection, according to embodiments of the disclosure. In some embodiments, the data collection apparatus 800 may be one embodiment of a data collection function, such as the data collection function 135, the DCNF 205, and/or the PSNF 505. Furthermore, data collection apparatus 800 may include a processor 805, a memory 810, an input device 815, an output device 820, a transceiver 825. In some embodiments, the input device 815 and the output device 820 are combined into a single device, such as a touch screen. In certain embodiments, the data collection apparatus 800 does not include any input device 815 and/or output device 820.

As depicted, the transceiver 825 includes at least one transmitter 830 and at least one receiver 835. Here, the transceiver 825 communicates with one or more network functions in the mobile communication network (e.g., PLMN). Additionally, the transceiver 825 may support at least one network interface 840. In some embodiments, the transceiver 825 supports different interfaces 840 for communicating with the various network functions in a mobile core network (e.g., a 5GC).

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825.

In various embodiments, the data collection apparatus 800 receives (e.g., via the transceiver 825) a first request from a network analytics function (e.g., NWDAF) to monitor and report occurrences of a first event. The processor 805 identifies a first type of network function (e.g., AMF, SMF, PCF, etc.) in a mobile communication network that reports occurrence of the first event. The processor 805 sends a second request to at least one network function of the first type to monitor and report occurrences of the first event and relays one or more reports of occurrence of monitoring events from the at least one network function to the network analytics function.

In some embodiments, sending the second request to the at least one network function comprises sending a subscription request to each network function of the first type in the mobile communication network to monitor and report occurrences of the first event.

In some embodiments, receiving the first request comprises receiving a list of one or more events, wherein the first event is contained within the list. In such embodiments, the processor 805 may also identify one or more additional types of network functions that monitor and report occurrences for all events in the list and send a subscription request to each network function of the identified types of network functions to report occurrences of an event in the list.

In some embodiments, the transceiver 825 receives a network function profile from a network function in the mobile communication network, the network function profile indicating a list of one or more monitoring events supported by the network function. In such embodiments, identifying the first type of network function comprises identifying the first type from the network function profile.

In certain embodiments, the second request contains a subscription identifier received from the network analytics function. In such embodiments, relaying one or more reports of occurrence of monitoring events from the at least one network function to the network analytics function may include receiving an event notification that includes the subscription identifier and forwarding the event notification to the network function associated with the subscription identifier.

In some embodiments, the second request comprises a notification message to publish occurrence of the first event. In such embodiments, sending the second request to the at least one network function comprises sending a notification message to each network function in the mobile communication network that subscribed (e.g., with the data collection function) to indicate they can report occurrence of the first event.

In certain embodiments, the transceiver 825 receives a third request from a second network analytics function (e.g., a second NWDAF) to monitor and report occurrences of a second event. In response to the processor 805 determining that the second event and the first event target the same device and/or the same area of interest, the processor 805 relays one or more reports of occurrences of monitoring events from the at least one network function to the second network analytics function.

In certain embodiments, the transceiver 825 receives a third request from a second network analytics function (e.g., a second NWDAF) to monitor and report occurrences of a second event, wherein the first type of network function reports occurrence of the second event. In such embodiments, the processor 805 sends a fourth request to the at least one network function of the first type, wherein the fourth request modifies an existing monitoring subscription to monitor and report additionally occurrences of the second event.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media. In some embodiments, the memory 810 stores data relating to data collection, for example storing lists of Events to monitor, occurrence of Events, Event filters, monitoring/reporting subscriptions, subscription targets, subscription IDs, NF profiles, and the like. In certain embodiments, the memory 810 also stores program code and related data, such as an operating system ("OS") or other controller algorithms operating on the data collection apparatus 800 and one or more software applications.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, may include any known electronically controllable display or display device. The output device 820 may be designed to output visual, audible, and/or haptic signals. In some embodiments, the output device 820 includes an electronic display capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, all or portions of the output device 820 may be located near the input device 815.

As discussed above, the transceiver 825 may communicate with one or more remote units and/or with one or more interworking functions that provide access to one or more PLMNs. The transceiver 825 may also communicate with one or more network functions (e.g., in the mobile core network 140). The transceiver 825 operates under the control of the processor 805 to transmit messages, data, and other signals and also to receive messages, data, and other signals. For example, the processor 805 may selectively activate the transceiver (or portions thereof) at particular times in order to send and receive messages.

The transceiver 825 may include one or more transmitters 830 and one or more receivers 835. In certain embodiments, the one or more transmitters 830 and/or the one or more receivers 835 may share transceiver hardware and/or circuitry. For example, the one or more transmitters 830 and/or the one or more receivers 835 may share antenna(s), antenna tuner(s), amplifier(s), filter(s), oscillator(s), mixer(s), modulator/demodulator(s), power supply, and the like. In one embodiment, the transceiver 825 implements multiple logical transceivers using different communication protocols or protocol stacks, while using common physical hardware.

Figure 9:
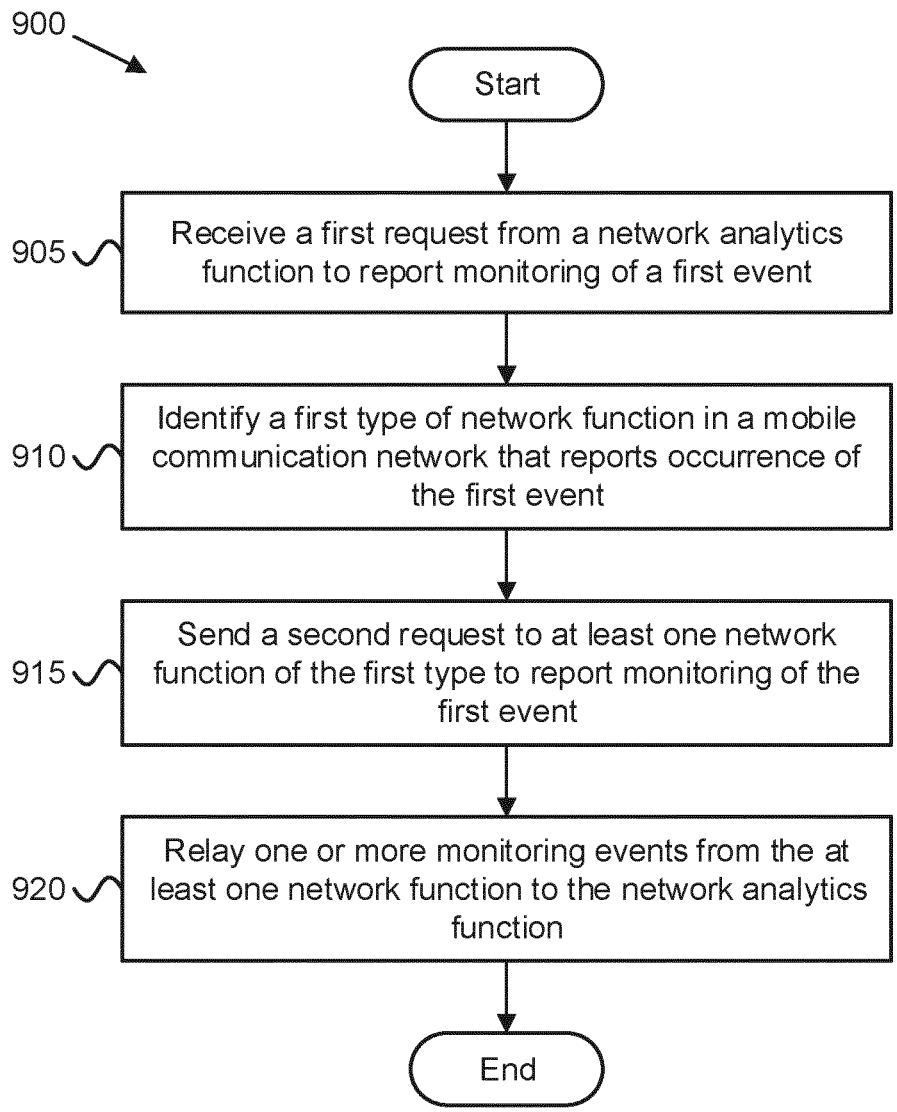
FIG. 9 is a flow chart diagram illustrating one embodiment of a method for data collection.

FIG. 9 depicts one embodiment of a method 900 for data collection, according to embodiments of the disclosure. In various embodiments, the method 900 is performed by a data collection function, such as the data collection function 135, the DCNF 205, the PSNF 505, and/or the data collection apparatus 800, described above. In some embodiments, the method 900 is performed by a processor, such as a microcontroller, a microprocessor, a central processing unit (CPU), a graphics processing unit (GPU), an auxiliary processing unit, a FPGA, or the like.

The method 900 begins and receives 905 a first request from a network analytics function (e.g., NWDAF) to monitor and report occurrences of a first event. The method 900 includes identifying 910 a first type of network function (e.g., AMF, SMF, PCF, etc.) in a mobile communication network that reports occurrence of the first event.

The method 900 includes sending 915 a second request to at least one network function of the first type to monitor and report occurrences of the first event. The method 900 includes relaying 920 one or more reports of occurrence of monitoring events from the at least one network function to the network analytics function. The method 900 ends.

Disclosed herein is a first apparatus for reporting power headroom, according to embodiments of the disclosure. The first apparatus may be implemented by a data collection function, such as the data collection function 135, the DCNF 205, the PSNF 505, and/or the data collection apparatus 800, described above. The first apparatus includes a transceiver that receives a first request from a network analytics function (e.g., NWDAF) to monitor and report occurrences of a first event. The first apparatus includes a processor that identifies a first type of network function (e.g., AMF, SMF, PCF, etc.) in a mobile communication network that reports occurrence of the first event. The processor sends a second request to at least one network function of the first type to monitor and report occurrences of the first event and relays one or more reports of occurrence of monitoring events from the at least one network function to the network analytics function.

In some embodiments, sending the second request to the at least one network function comprises sending a subscription request to each network function of the first type in the mobile communication network to monitor and report occurrences of the first event.

In some embodiments, receiving the first request comprises receiving a list of one or more events, wherein the first event is contained within the list. In such embodiments, the processor may also identify one or more additional types of network functions that monitor and report occurrences for all events in the list and send a subscription request to each network function of the identified types of network functions to monitor and report occurrences of an event in the list.

In some embodiments, the transceiver receives a network function profile from a network function in the mobile communication network, the network function profile indicating a list of one or more monitoring events supported by the network function. In such embodiments, identifying the first type of network function comprises identifying the first type from the network function profile.

In certain embodiments, the second request contains a subscription identifier received from the network analytics function. In such embodiments, relaying one or more report of occurrence of monitoring events from the at least one network function to the network analytics function may include receiving an event notification that includes the subscription identifier and forwarding the event notification to the network function associated with the subscription identifier.

In some embodiments, the second request comprises a notification message to publish occurrence of the first event. In such embodiments, sending the second request to the at least one network function comprises sending a notification message to each network function in the mobile communication network that subscribed (e.g., with the data collection function) to indicate they can report occurrence of the first event.

In certain embodiments, the transceiver receives a third request from a second network analytics function (e.g., a second NWDAF) to monitor and report occurrences of a second event. In response to the processor determining that the second event and the first event target the same device and/or the same area of interest, the processor relays one or more reports of occurrence of monitoring events from the at least one network function to the second network analytics function.

In certain embodiments, the transceiver receives a third request from a second network analytics function (e.g., a second NWDAF) to monitor and report occurrences of a second event, wherein the first type of network function reports occurrence of the second event. In such embodiments, the processor sends a fourth request to the at least one network function of the first type, wherein the fourth request modifies an existing monitoring subscription to additionally monitor and report occurrences of the second event.

Disclosed herein is a first method for reporting power headroom, according to embodiments of the disclosure. The first method may be performed by a data collection function, such as the data collection function 135, the DCNF 205, the PSNF 505, and/or the data collection apparatus 800, described above. The first method includes receiving a first request from a network analytics function (e.g., a NWDAF) to monitor and report occurrences of a first event and identifying a first type of network function (e.g., AMF, SMF, PCF, etc.) in a mobile communication network (e.g., in a PLMN) that reports occurrence of the first event. The first method includes sending a second request to at least one network function of the first type to monitor and report occurrences of the first event and relaying one or more reports of occurrence of monitoring events from the at least one network function to the network analytics function.

In some embodiments, sending the second request to the at least one network function comprises sending a subscription request to each network function of the first type in the mobile communication network to monitor and report occurrences of the first event.

In some embodiments, receiving the first request comprises receiving a list of one or more events, wherein the first event is contained within the list. In such embodiments, the first method includes identifying one or more additional types of network functions that monitor and report occurrences for all events in the list and sending a subscription request to each network function of the identified types of network functions to monitor and report occurrences of an event in the list.

In some embodiments, the first method includes receiving a network function profile from a network function in the mobile communication network, the network function profile indicating a list of one or more monitoring events supported by the network function. In such embodiments, identifying the first type of network function comprises identifying the first type from the network function profile.

In certain embodiments, the second request contains a subscription identifier received from the network analytics function. In such embodiments, relaying one or more reports of occurrence of monitoring events from the at least one network function to the network analytics function may include receiving an event notification that includes the subscription identifier and forwarding the event notification to the network function associated with the subscription identifier.

In some embodiments, the second request comprises a notification message to publish occurrence of the first event. In such embodiments, sending the second request to the at least one network function comprises sending a notification message to each network function in the mobile communication network that subscribed (e.g., with the data collection function) to indicate they can report occurrence of the first event.

In certain embodiments, the first method includes receiving a third request from a second network analytics function (e.g., a second NWDAF) to monitor and report occurrences of a second event. In response to determining that the second event and the first event target the same device and/or the same area of interest, the first method includes relaying one or more reports of occurrence of monitoring events from the at least one network function to the second network analytics function.

In certain embodiments, the first method includes receiving a third request from a second network analytics function (e.g., a second NWDAF) to monitor and report occurrences of a second event, wherein the first type of network function reports occurrence of the second event. In such embodiments, the first method includes sending a fourth request to the at least one network function of the first type, wherein the fourth request modifies an existing monitoring subscription to monitor and report additionally occurrence of the second event.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a data collection function in a mobile communication network, the method comprising:
   receiving, from a first network analytics function, a first request to monitor and report occurrences of a first event;
   determining a first type of network function that supports reporting an occurrence of the first event;
   transmitting, to at least one network function of the first type, a second request to monitor and report occurrences of the first event;
   relaying one or more reports of the occurrence of the first event from the at least one network function to the first network analytics function;
   receiving a third request from a second network analytics function to monitor and report occurrences of a second event;
   determining that the second event and the first event target a same device or a same area of interest, or both; and
   relaying the one or more reports of the occurrence of the first event from the at least one network function to the second network analytics function.

2. The method of claim 1, wherein the second request to the at least one network function comprises transmitting a subscription request to each network function of the first type in the mobile communication network to monitor and report occurrences of the first event.

3. The method of claim 1, wherein receiving the first request comprises receiving a list of one or more events, wherein the first event is contained within the list.

4. The method of claim 3, further comprising:
identifying one or more additional types of network functions that monitor and report occurrences for all events in the list; and
transmitting a subscription request to each network function of the identified one or more additional types of network functions to monitor and report occurrences of an event in the list.

5. The method of claim 1, further comprising receiving a network function profile from a network function in the mobile communication network, the network function profile indicating a list of one or more monitoring events supported by the network function.

6. The method of claim 5, wherein determining identifying the first type of network function comprises determining the first type from the network function profile.

7. The method of claim 1, wherein the second request contains a subscription identifier received from the first network analytics function, wherein relaying the one or more reports of occurrence of monitoring events from the at least one network function to the first network analytics function comprises:
receiving an event notification that includes the subscription identifier; and
forwarding the event notification to the network function associated with the subscription identifier.

8. The method of claim 1, wherein the second request comprises a notification message to monitor and publish the occurrence of the first event.

9. The method of claim 8, wherein transmitting sending the second request to the at least one network function comprises transmitting, sending, by a data collection function, a notification message to each network function in the mobile communication network that subscribed with the data collection function to report the occurrence of the first event.

10. The method of claim 1, further comprising:
receiving a fourth request from the second network analytics function to monitor and report occurrences of the second event, wherein the first type of network function reports occurrence of the second event; and
transmitting, to the at least one network function of the first type, a request to modify an existing monitoring subscription to monitor and report occurrences of the second event and occurrences of the first event.

11. A network apparatus comprising a data collection function, the network apparatus further comprising:
a memory; and
a processor coupled with the memory and configured to cause the data collection function to:
receive, from a first network analytics function, a first request to monitor and report occurrences of a first event;
determine a first type of network function that supports reporting an occurrence of the first event;
transmit, to at least one network function of the first type, a second request to monitor and report occurrences of the first event;
relay one or more reports of the occurrence of the first event from the at least one network function to the first network analytics function;
receive a third request from a second network analytics function to monitor and report occurrences of a second event;
determine that the second event and the first event target a same device or a same area of interest, or both; and
relay the one or more reports of the occurrence of the first event from the at least one network function to the second network analytics function.

12. The network apparatus of claim 11, wherein to transmit the second request to the at least one network function, the processor is configured to cause the data collection function to cause the data collection function to transmit a subscription request to each network function of the first type in a mobile communication network to monitor and report occurrences of the first event.

13. The network apparatus of claim 11, wherein to receive the first request, the processor is configured to cause the data collection function to cause the data collection function to receive a list of one or more events, wherein the first event is contained within the list.

14. The network apparatus of claim 13, wherein the processor is configured to cause the data collection function to:
identify one or more additional types of network functions that monitor and report occurrences for all events in the list; and
transmit a subscription request to each network function of the identified one or more additional types of network functions to monitor and report occurrences of an event in the list.

15. The network apparatus of claim 11, wherein the processor is configured to cause the data collection function to receive, from a network function in a mobile communication network, a network function profile indicating a list of one or more monitoring events supported by the network function.

16. The network apparatus of claim 15, wherein to determine the first type of network function, the processor is configured to cause the data collection function to cause the data collection function to determine the first type from the network function profile.

17. The network apparatus of claim 11, wherein the second request contains a subscription identifier received from the first network analytics function, wherein to relay the one or more reports of the occurrence of monitoring events from the at least one network function to the first network analytics function, the processor is configured to cause the data collection function to cause the data collection function to:
receive an event notification that includes the subscription identifier; and
forward, the event notification to the network function associated with the subscription identifier.

18. The network apparatus of claim 11, wherein the second request comprises a notification message to monitor and publish the occurrence of the first event.

19. The network apparatus of claim 18, wherein to transmit the second request to the at least one network function, the processor is configured to cause the data collection function to cause the data collection function to transmit a notification message to each network function in a mobile communication network that subscribed with the data collection function to report the occurrence of the first event.

20. The network apparatus of claim 11, wherein the processor is configured to cause the data collection function to:
 receive a fourth request from the second network analytics function to monitor and report occurrences of the second event, wherein the first type of network function reports occurrence of the second event; and
 transmit, to the at least one network function of the first type, a request to modify an existing monitoring subscription to monitor and report occurrences of the second event and occurrences of the first event.

\* \* \* \* \*